(12) United States Patent
Matsudaira

(10) Patent No.: US 9,333,966 B2
(45) Date of Patent: May 10, 2016

(54) CONTROL APPARATUS FOR HYBRID VEHICLE

(71) Applicant: Toyota Jidosha Kabushiki Kaisha, Toyota-shi, Aichi (JP)

(72) Inventor: Yuto Matsudaira, Miyoshi (JP)

(73) Assignee: Toyota Jidosha Kabushiki Kaisha (JP)

( * ) Notice: Subject to any disclaimer, the term of this patent is extended or adjusted under 35 U.S.C. 154(b) by 73 days.

(21) Appl. No.: 14/264,909

(22) Filed: Apr. 29, 2014

(65) Prior Publication Data

US 2014/0330465 A1    Nov. 6, 2014

Related U.S. Application Data

(60) Provisional application No. 61/818,583, filed on May 2, 2013.

(51) Int. Cl.
| | |
|---|---|
| *B60L 9/00* | (2006.01) |
| *B60L 11/00* | (2006.01) |
| *G05D 1/00* | (2006.01) |
| *B60W 20/00* | (2016.01) |
| *B60K 6/38* | (2007.10) |
| *B60K 6/387* | (2007.10) |
| *B60K 6/48* | (2007.10) |

(Continued)

(52) U.S. Cl.
CPC ............... *B60W 20/00* (2013.01); *B60K 6/38* (2013.01); *B60K 6/387* (2013.01); *B60K 6/48* (2013.01); *B60K 6/547* (2013.01); *B60K 28/14* (2013.01); *B60W 2030/082* (2013.01); *B60W 2510/0638* (2013.01); *B60W 2510/081* (2013.01); *B60W 2710/027* (2013.01); *Y02T 10/6221* (2013.01);

(Continued)

(58) Field of Classification Search
CPC .......... B60W 2030/082; B60W 30/08; B60W 30/186; B60W 20/00; B60W 2510/0638; B60K 6/38

USPC ......................................... 701/22, 67; 477/39
See application file for complete search history.

(56) References Cited

U.S. PATENT DOCUMENTS

| | | | |
|---|---|---|---|
| 2010/0235029 A1* | 9/2010 | Becker ................... | B60K 6/365 701/22 |
| 2011/0115318 A1* | 5/2011 | Hashimoto ............ | B60K 3/687 310/78 |

FOREIGN PATENT DOCUMENTS

| | | | | |
|---|---|---|---|---|
| JP | 2010149714 A | * | 7/2010 | |
| JP | 2010178595 A | * | 8/2010 | |

(Continued)

OTHER PUBLICATIONS

Machine Translation of Japanese Publication No. JP 2010-178595 A; Published Aug. 12, 2010.

*Primary Examiner* — Tuan C. To
*Assistant Examiner* — Isaac Smith
(74) *Attorney, Agent, or Firm* — Dinsmore & Shohl LLP

(57) ABSTRACT

Control apparatuses for hybrid vehicles are disclosed which rapidly decrease the voltage of an inverter following a collision. The control apparatus increases a force of engagement of a clutch when an operating speed of an engine is lower than an operating speed of an electric motor after a collision, and reduces the force of engagement of the clutch when the operating speed of the engine is equal to or higher than the operating speed of the electric motor after the collision. Accordingly, the clutch is placed in an engaged state when the engine applies a load to the electric motor, and is placed in a released state when the operating speed of the electric motor is raised by the engine in the engaged state of the clutch so that the operating speed of the electric motor can be rapidly lowered and a voltage of an inverter can be rapidly lowered.

10 Claims, 5 Drawing Sheets

(51) Int. Cl.
*B60K 6/547* (2007.10)
*B60K 28/14* (2006.01)
*B60W 30/08* (2012.01)

(52) U.S. Cl.
CPC ........... *Y02T 10/7077* (2013.01); *Y10S 903/914* (2013.01)

(56) References Cited

FOREIGN PATENT DOCUMENTS

| | | |
|---|---|---|
| JP | 2014100959 A | 6/2014 |
| WO | 2014076563 A1 | 5/2014 |

\* cited by examiner

CONTROL APPARATUS FOR HYBRID VEHICLE

CROSS REFERENCE TO RELATED APPLICATIONS

The present specification claims priority to U.S. Provisional Patent Application Ser. No. 61/818,583 filed May 2, 2013 and entitled "CONTROL DEVICE FOR HYBRID VEHICLE," the entirety of which is incorporated by reference herein.

TECHNICAL FIELD

The present specification relates to control apparatuses for a hybrid vehicles provided with a clutch disposed in a power transmitting path between an engine and an electric motor, and more particularly to an improvement for rapidly lowering a voltage of an inverter upon collision of the hybrid vehicle.

BACKGROUND

Drive systems for hybrid vehicles may include an engine, an electric motor, a clutch disposed in a power transmitting path between the engine and the electric motor, and an inverter for supplying electric energy from an electric energy storage device to the electric motor. In the drive system of these types of hybrid vehicles, it is required to discharge an electric load stored in a smoothing capacitor of the inverter upon collision of the hybrid vehicle. A technique for meeting this requirement has been proposed. Patent Document 1 discloses an example of a vehicle control apparatus embodying this technique.

PRIOR ART DOCUMENT

Patent Document

Patent Document 1: JP-2010-178595A

SUMMARY

However, conventional techniques for discharging the smoothing capacitor may not be able to rapidly lower the voltage of the inverter upon collision of the hybrid vehicle. Namely, when a collision of the hybrid vehicle takes place while the electric motor is being operated, it may be difficult to rapidly drop the voltage of the inverter due to the generation of a reverse electromotive force by the electric motor which may be in a freely operated state depending upon an operating state of the clutch disposed between the engine and the electric motor. This drawback was found as a result of intensive research in an effort to improve the performance of the hybrid vehicle.

The embodiments described herein were made in view of the background art described above and provide control apparatuses for hybrid vehicles which permit rapid lowering of the voltage of the inverter upon collision of the hybrid vehicle.

A first aspect of the present specification provides a control apparatus for a hybrid vehicle which is provided with an engine, an electric motor, a clutch disposed in a power transmitting path between the engine and the electric motor, and an inverter for supplying electric energy from an electric energy storage device to the electric motor, wherein the inverter is configured to be discharged upon a collision of the hybrid vehicle, the control apparatus being characterized by increasing a force of engagement of the clutch when an operating speed of the engine is lower than an operating speed of the electric motor after the collision of the hybrid vehicle, and reducing the force of engagement of said clutch when the operating speed of the engine is equal to or higher than the operating speed of the electric motor after the collision of the hybrid vehicle.

According to the first aspect of the present specification, the force of engagement of the clutch is increased when the operating speed of the engine is lower than the operating speed of the electric motor after the collision of the hybrid vehicle, and is reduced when the operating speed of the engine is equal to or higher than the operating speed of the electric motor after the collision of the hybrid vehicle. Accordingly, the clutch is placed in an engaged state when the engine applies a load to the electric motor, and is placed in a released state when the operating speed of the electric motor is raised by the engine in the engaged state of the clutch, so that the operating speed of the electric motor can be rapidly lowered, and the voltage of the inverter can be rapidly lowered. Namely, the present specification provides a control apparatus for the hybrid vehicle, which permits rapid lowering of the voltage of the inverter upon collision of the hybrid vehicle.

According to a second aspect of the present specification dependent on the first aspect, the force of engagement of the clutch is increased and then periodically increased and reduced alternately when the operating speed of the engine is lower than the operating speed of the electric motor after the collision of the hybrid vehicle. Accordingly, it is possible to effectively reduce an increase of a temperature of the clutch, as well as to rapidly lower the operating speed of the electric motor.

DETAILED DESCRIPTION

The systems and methods described herein are suitably applicable to a hybrid vehicle constructed such that a crankshaft of the engine is connected to a rotor of the electric motor through the clutch, and is provided with a torque converter and an automatic transmission which are disposed in a power transmitting path between the rotor and vehicle drive wheels. However, the systems and methods described herein are also applicable to hybrid vehicles in which the automatic transmission is disposed in a power transmitting path between the electric motor and the vehicle drive wheels, in the absence of the torque converter.

According to one embodiment, the clutch is initially placed in a released state (in an initial step of control) upon detection of a collision of the hybrid vehicle. When the operating speed of the engine is lower than the operating speed of the electric motor after the clutch is initially placed in the released state, the clutch is brought into an engaged state. In embodiments, the clutch may be controlled so as to be periodically placed in the engaged and released states alternately when the operating speed of the engine is lower than the operating speed of the electric motor even after the clutch is brought into the engaged state. The clutch is held in the released state when the operating speed of the engine is equal to or higher than the operating speed of the electric motor after the clutch is initially placed in the released state.

According to another embodiment, upon detection of the collision of the hybrid vehicle, power supply lines from the electric energy storage device to the inverter are placed in a power-off state, and a fuel cut control is implemented to stop a fuel supply to the engine, while a clutch provided in the automatic transmission provided in the power transmitting path between the electric motor and the drive wheels is brought to a released state to inhibit power transmission between the electric motor and the drive wheels.

According to a further embodiment, upon detection of the collision of the hybrid vehicle, a drive circuit for a linear solenoid valve for controlling the operating state of (a torque transmitted through) the clutch is electrically connected to a circuit for controlling an operation of the electric motor. Preferably, a solenoid coil provided in the linear solenoid valve is connected in parallel to a smoothing capacitor provided in the inverter.

Various embodiments of the systems and apparatus will be described in further detail herein with specific reference to the drawings.

Figure 1:
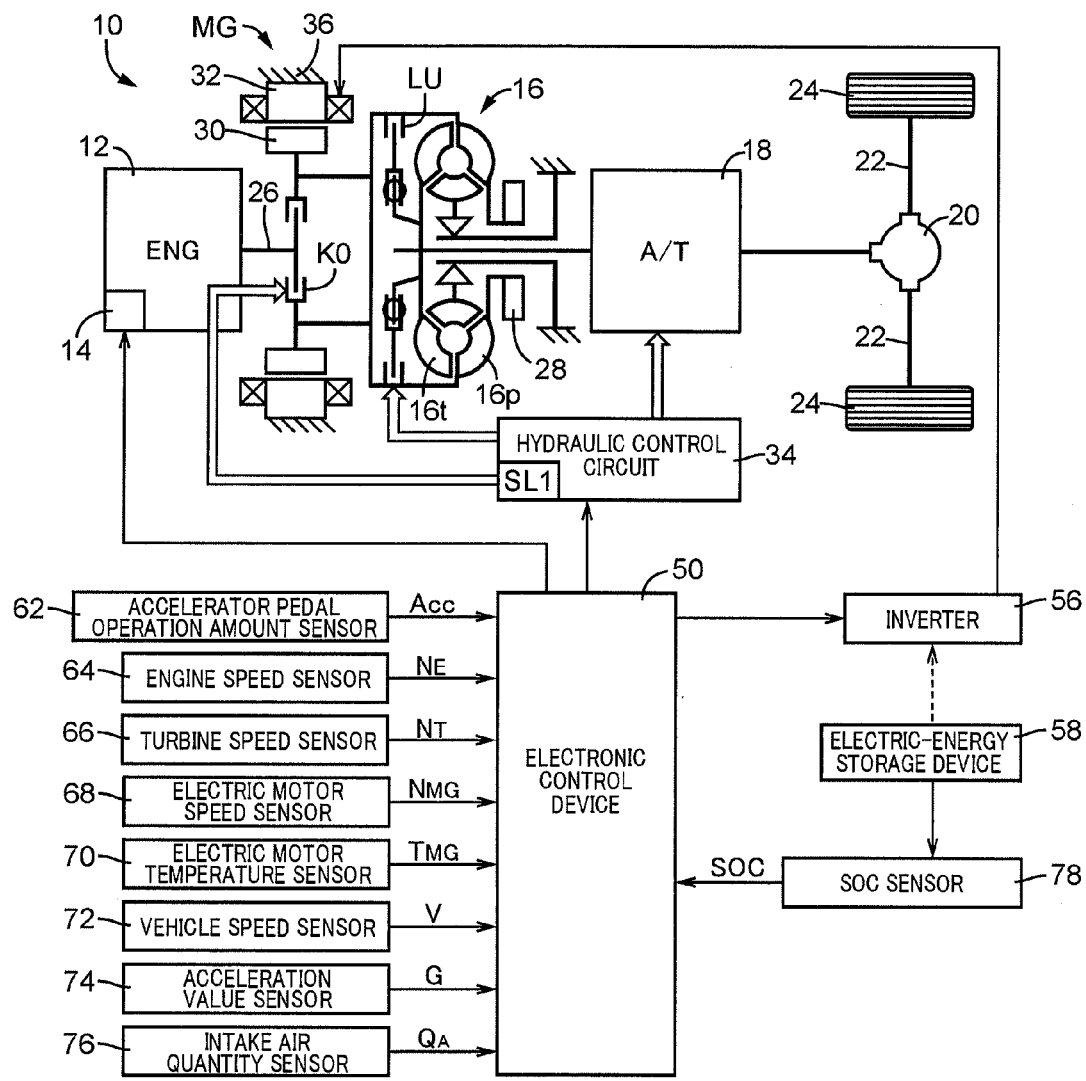
FIG. 1 schematically depicts an arrangement of a drive system of a hybrid vehicle to which the present specification is suitably applicable.

Referring now to FIG. 1, an arrangement of a drive system of a hybrid vehicle 10 to which the embodiments described herein are suitably applicable is schematically depicted. As shown in FIG. 1, the hybrid vehicle 10 is provided with an engine 12 and an electric motor MG, which function as vehicle drive power sources. Drive forces generated by the engine 12 and the electric motor MG are transmitted to a pair of left and right drive wheels 24 through a torque converter 16, an automatic transmission 18, a differential gear device 20, and a pair of left and right axles 22. The electric motor MG, torque converter 16 and automatic transmission 18 are accommodated in a transmission casing 36. This transmission casing 36 is an aluminum split casing formed by die casting. The transmission casing 36 is fixed to a stationary member such as a vehicle body. In the hybrid vehicle 10 arranged as described above, at least one of the engine 12 and electric motor MG is used as the vehicle drive power source. Namely, the hybrid vehicle 10 is configured to selectively establish one of a plurality of drive modes such as: an engine drive mode in which the engine 12 is exclusively used as the drive power source; an EV drive (motor drive) mode in which the electric motor MG is exclusively used as the drive power source; and a hybrid drive (EHV drive) mode in which the engine 12 and electric motor MG are used as the drive power sources.

For example, the engine 12 is an internal combustion engine, such as a gasoline or diesel engine of a direct injection type, in which a fuel is directly injected into its combustion chambers. To control an operation (output torque) of the engine 12, there is provided an output control device 14 provided with a throttle actuator for opening and closing an electronic throttle valve, a fuel injecting device for implementing a fuel injection control, an igniting device for implementing an ignition timing control, etc. The output control device 14 is controlled according to commands supplied from an electronic control device 50, described below, to control the output of the engine 12 by controlling the throttle actuator to open and close the electronic throttle valve, controlling the fuel injecting device to control the injection of the fuel, and controlling the igniting device to control the ignition timing.

Between a pump impeller 16p and a turbine impeller 16t of the torque converter 16, there is provided a lock-up clutch LU configured to connect the pump and turbine impellers 16p, 16t directly to each other so that the impellers 16p, 16t are rotated as a unit. This lock-up clutch LU is controlled to be placed in one of an engaged state (fully engaged state), a slipping state and a released state (fully released state), according to a hydraulic pressure received from a hydraulic control circuit 34. The pump impeller 16p of the torque converter 16 is connected to a mechanical oil pump 28 which is operated by the rotary motion of the pump impeller 16p to generate the hydraulic pressure to be applied to and controlled by the hydraulic control circuit 34.

For example, the automatic transmission 18 may be a step-variable automatic transmission which is shifted to a selected one of a plurality of predetermined speed positions (speed ratios), and which is provided with a plurality of coupling elements for performing the shifting actions. For example, the automatic transmission 18 may be provided with a plurality of hydraulically operated frictional coupling devices, such as multiple-disk clutches and brakes, which are placed in their engaged and released states by respective hydraulic actuators. These frictional coupling devices are selectively engaged and released according to hydraulic pressure applied thereto from the hydraulic control circuit 34 to selectively establish a plurality of forward drive speed positions or gear positions (first through sixth speed positions, for example) and a rear drive position or gear position, according to respective combinations of the engaged and released states of the hydraulically operated frictional coupling devices.

The electric motor MG is a motor/generator which is provided with a rotor 30 supported by the transmission casing 36 rotatably about its axis, and a stator 32 integrally fixed to the transmission casing 36 radially outwardly of the rotor 30. and the electric motor MG functions as an electric motor which generates a drive force and an electric generator which generates a reaction force. The electric motor MG is connected through an inverter 56 to an electric energy storage device 58, such as a battery or capacitor, and the operation of the electric motor MG is controlled by the electronic control device 50, described below, which regulates an amount of a drive current to be applied to coils of the electric motor MG by controlling the inverter 56. In other words, an output torque of the electric motor MG is increased and reduced through the inverter 56. Electric energy generated by the electric motor MG during its regenerative operation is supplied to the electric energy storage device 58 through the inverter 56. An arrangement of this inverter 56 will be described with reference to FIG. 2, etc.

In a power transmitting path between the engine 12 and electric motor MG, there is disposed a clutch K0 to control the transmission of power through the power transmitting path depending upon its operating state. Namely, an output member of the engine 12 in the form of a crankshaft 26 is selectively connected to the rotor 30 of the electric motor MG through the clutch K0. The rotor 30 of the electric motor MG is fixed to an input member of the torque converter 16 in the form of a front cover. For example, the clutch K0 is a hydraulically operated frictional coupling device of a multiple-disk type which is operated by a hydraulic actuator, that is, selectively placed in one of an engaged state (fully engaged state), a slipping state and a released state (fully released state) according to a hydraulic pressure received from a linear solenoid valve SL1 provided in the hydraulic control circuit 34. That is, a torque capacity of the clutch K0 is controlled according to the hydraulic pressure received from the linear solenoid valve SL1. A power transmitting path between the crankshaft 26 and the front cover of the torque converter 16 is placed in a power transmitting state (connected state) when the clutch K0 is placed in the engaged state, and in a power cut-off state when the clutch K0 is placed in the released state. When the clutch K0 is placed in the slipping state, the state of power transmission through the power transmitting path between the crankshaft 26 and the front cover of the torque converter 16 varies with the torque capacity of the clutch K0 (changes with a torque transmitted through the clutch K0).

The hybrid vehicle 10 is provided with the control system shown in FIG. 1. In the embodiments described herein, the electronic control device 50 may include a processor and a memory storing a computer readable and executable instruction set which, when executed by the processor, controls the various functions of the hybrid vehicle, including, without limitation, the drive system and the various components of the drive system. For example, the electronic control device 50 shown in FIG. 1 includes a so-called microcomputer comprising a CPU, a RAM, a ROM and an input-output interface. The CPU performs signal processing operations according to programs stored in the ROM, while utilizing a temporary data storage function of the RAM, to implement various controls such as an operating control of the engine 12, an operating control of the electric motor MG, a shifting control of the automatic transmission 18, an engaging force control of the clutch K0, a control of the inverter 56, and an engaging control of the lock-up clutch LU. This electronic control device 50 is constituted by a plurality of control units, as needed, such as a unit for controlling the engine 12, a unit for controlling the electric motor MG, a unit for controlling the automatic transmission 18, and a unit for controlling the inverter 56. These control units may be configured to implement respective control operations, while effecting mutual communications. In this embodiment, the electronic control device 50 corresponds to a control apparatus for the hybrid vehicle 10.

As indicated in FIG. 1, the electronic control device 50 receives various input signals generated by respective sensors provided on the hybrid vehicle 10, such as: an output signal of an accelerator pedal operation amount sensor 62 indicative of an operation amount $A_{cc}$ of an accelerator pedal (not shown); an output signal of an engine speed sensor 64 indicative of an operating speed $N_E$ of the engine 12 (engine speed $N_E$); an output signal of a turbine speed sensor 66 indicative of a rotating speed $N_T$ of the turbine impeller 16t of the torque converter 16 (turbine speed $N_T$); an output signal of an electric motor speed sensor 68 indicative of an operating speed $N_{MG}$ of the electric motor MG (electric motor speed $N_{MG}$); an output signal of an electric motor temperature sensor 70 indicative of a temperature $T_{MG}$ of the electric motor MG; an output signal of a vehicle speed sensor 72 indicative of a vehicle running speed V; an output signal of an acceleration value sensor 74 indicative of a longitudinal acceleration value G of the hybrid vehicle 10; an output signal of an intake air quantity sensor 76 indicative of an intake air quantity $Q_A$ of the engine 12; and an output signal of an SOC sensor 78 indicative of a stored electric energy amount (residual energy amount or charging amount) SOC of the electric energy storage device 58.

The electronic control device 50 generates various signals to be applied to respective devices provided on the hybrid vehicle 10, such as: signals to be applied to the output control device 14 for the engine 12 to control the operation of the engine 12; a signal to be applied to the inverter 56, to control the operation of the electric motor MG; signals to be applied to a plurality of electromagnetic control valves provided in the hydraulic control circuit 34, to control the shifting actions of the automatic transmission 18; a signal to be applied to the linear solenoid valve SL1 provided in the hydraulic control circuit 34 to control the engaging action of the clutch K0; a signal to be applied to a linear solenoid valve provided in the hydraulic control circuit 34 to control the engaging action of the lock-up clutch LU; and a signal to be applied to a linear solenoid valve provided in the hydraulic control circuit 34 to control a line pressure.

Figure 2:
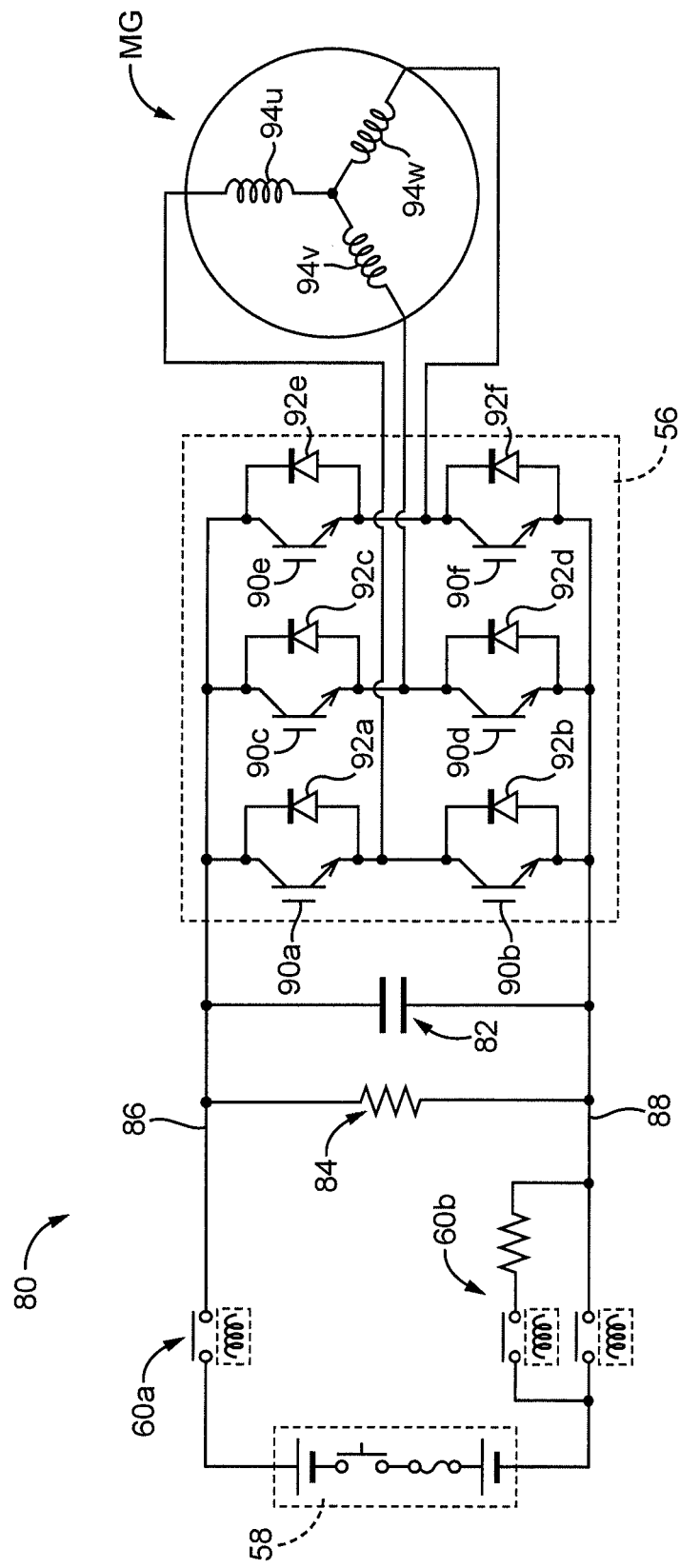
FIG. 2 schematically depicts a major portion of an example of an electric circuit for controlling an electric motor of the hybrid vehicle of FIG. 1.

FIG. 2 schematically depicts a major portion of an example of an electric circuit 80 for controlling the electric motor MG. The electric circuit 80 illustrated in FIG. 2 corresponds to an electric power source control circuit for supplying electric energy to the electric motor MG, and is provided with the inverter 56, the electric energy storage device 58, relays 60a and 60b (hereinafter referred to simply as "relays 60" unless otherwise specified), a smoothing capacitor 82, and a discharging resistor 84. The electric energy storage device 58 may be a conventional chargeable and dischargeable secondary battery such as a lithium ion battery pack and/or a nickel-metal hydride battery pack. In embodiments, a voltage converter (voltage raising and lowering circuit) is provided between the electric energy storage device 58 and the inverter 56. However, description of this voltage converter in this embodiment is omitted.

The relays 60 are provided to selectively place power supply lines from the electric energy storage device 58 to the inverter 56 in a power-on state (power supply state) or a power-off state. For example, the relay 60a is disposed between a positive pole of the electric energy storage device 58 and a power line 86 so as to selectively place the power supply line between the positive pole of the electric energy storage device 58 and the power line 86 in the power-on and power-off states according to a control signal received from the electronic control device 50. Similarly, the relay 60b is disposed between a negative pole of the electric energy storage device 58 and an earth line 88 to selectively place the power supply line between the negative pole of the electric energy storage device 58 and the earth line 88 in the power-on and power-off states according to a control signal received from the electronic control device 50.

The smoothing capacitor 82 reduces voltage variations (pulsation) in the electric circuit 80. For example, the smoothing capacitor 82 is connected between the power line 86 and the earth line 88, as indicated in FIG. 2, to smooth the voltage variation between the power and earth lines 86 and 88. Although the electric circuit 80 illustrated in FIG. 2 is provided with only one smoothing capacitor 82 between the power line 86 and the earth line 88, the electric circuit 80 may be modified such that voltage raising and lowering devices (not shown) respectively disposed on the sides of the electric energy storage device 58 and the inverter 56 are provided with two smoothing capacitors, respectively. The discharging resistor 84 is connected between the power line 86 and earth line 88 in parallel with the smoothing capacitor 82, as shown in FIG. 2. According to this arrangement, the discharging resistor 84 functions as a resistor element to discharge electric energy accumulated in the smoothing capacitor 82 upon termination of normal operation of the electric circuit 80.

The inverter 56 is provided with a plurality of semiconductor switching elements 90a-90f (hereinafter referred to simply as "switching elements 90," unless otherwise specified) which are turned on and off (to perform switching operations) according to control signals received from the electronic control device 50. For example, the switching elements 90 are preferably IGBTs (Insulated Gate Bipolar Transistors). That is, the inverter 56 is provided with switching elements 90a and 90b forming a U-phase arm, switching elements 90c and 90d forming a V-phase arm, and switching elements 90e and 90f forming a W-phase arm, as shown in FIG. 2. Between a collector and an emitter of each of the switching elements 90a-90f there is connected an anti-parallel diode 92a-92f configured to permit a flow of an electric current from the emitter to the collector.

For example, the electric motor MG may be a three-phase permanent magnet motor having a U-phase coil 94u, a V-phase coil 94v and a W-phase coil 94w all of which are connected to a neutral point, as shown in FIG. 2. The switching elements 90a and 90b of the inverter 56 are electrically connected at an intermediate point therebetween to the U-phase coil 94u, such that a U-phase voltage corresponding to the U-phase coil 94u is generated according to a switching control of the switching elements 90a and 90b. The switching elements 90c and 90d are electrically connected at an intermediate point therebetween to the V-phase coil 94v, such that a V-phase voltage corresponding to the V-phase coil 94v is generated according to a switching control of the switching elements 90c and 90d. The switching elements 90e and 90f are electrically connected at an intermediate point therebetween to the W-phase coil 94w, such that a W-phase voltage corresponding to the W-phase coil 94w is generated according to a switching control of the switching elements 90e and 90f.

Figure 3:
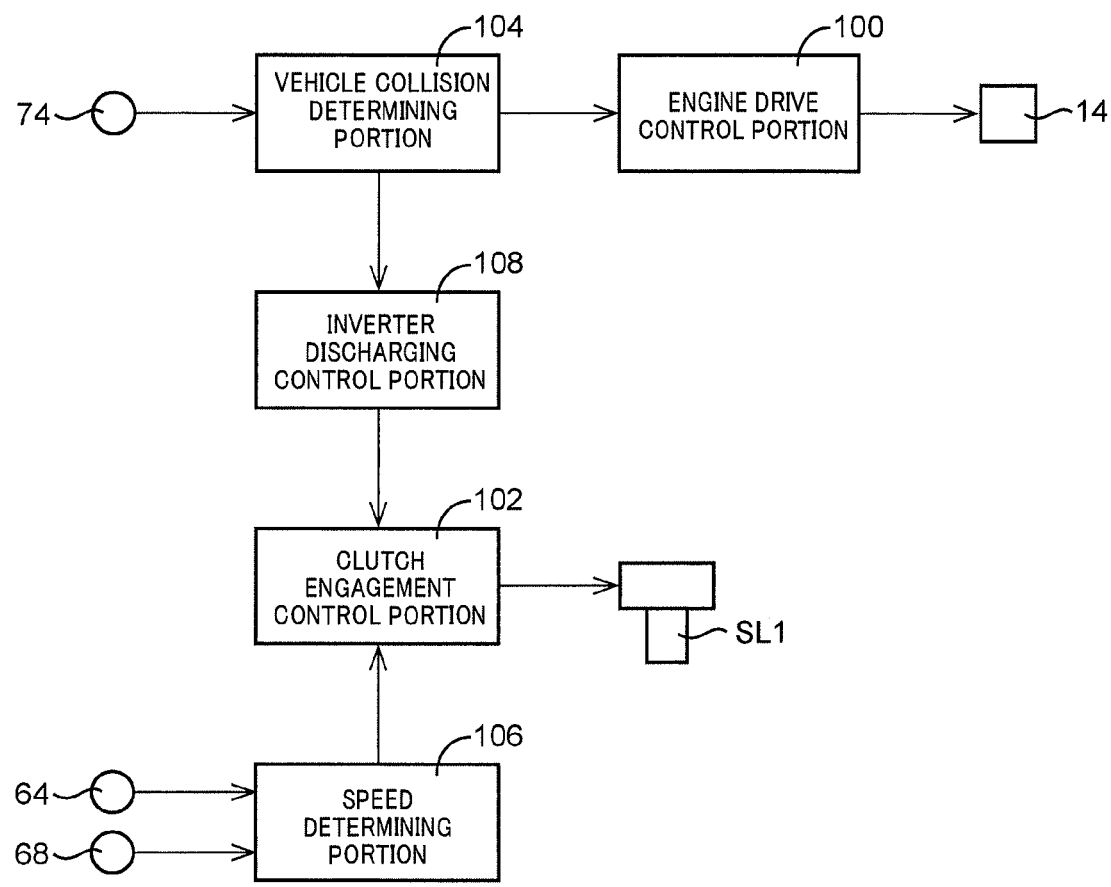
FIG. 3 is a functional block diagram of an electronic control device of the hybrid vehicle of FIG. 1.

FIG. 3 is a functional block diagram for explaining major control functions of the electronic control device 50. An engine drive control portion 100 indicated in FIG. 3 is provided to control the operation (output torque) of the engine 12 through the output control device 14. Described more specifically, the engine drive control portion 100 is configured to command the output control device 14 to control an opening angle θTH of an electronic throttle valve of the engine 12, an amount fuel supplied from a fuel injecting device to the engine 12, and a timing of ignition of the engine 12 by an igniting device, for thereby controlling the operation of the engine 12 so as to provide a required output, that is, a target engine output.

The engine drive control portion 100 operates the engine 12 in the engine drive mode and hybrid drive (EHV drive) mode. That is, the engine drive control portion 100 implements an engine starting control to start the engine 12 when the vehicle drive mode is switched from the EV drive mode to the engine drive mode or hybrid drive mode. For example, the engine drive control portion 100 starts the engine 12 by placing the clutch K0 in the engaged state. Namely, the engine drive control portion 100 commands a clutch engagement control portion 102 described below, to place the clutch K0 in the slipping state or fully engaged state for causing rotary motion of the engine 12 with a torque transmitted thereto through the clutch K0. Preferably, the clutch K0 is held in the slipping state for at least a suitable length of time in the process of a change from the released state to the engaged state to reduce shock. A rise of the engine speed $N_E$ by the rotary motion and initiation of the engine ignition and fuel supply under the control of the output control device 14 permit the engine 12 to be operated by itself.

The engine drive control portion 100 holds the engine 12 in the rest state in the EV drive mode. That is, the engine drive control portion 100 implements an engine stopping control to stop the engine 12 when the vehicle drive mode is switched from the engine drive mode or hybrid drive mode to the EV drive mode. For instance, the engine drive control portion 100 places the clutch K0 in the released state and stops the operation of the engine 12. Namely, the engine drive control portion 100 commands the clutch engagement control portion 102, described below, to place the clutch K0 in the slipping state or fully released state, and commands the output control device 14 to stop the engine ignition and fuel supply. Preferably, the clutch K0 is held in the slipping state for at least a suitable length of time in the process of a change from the engaged state to the released state to reduce shock.

The clutch engagement control portion 102 is configured to implement an engagement control of the clutch K0 through the linear solenoid valve SL1 provided in the hydraulic control circuit 34. That is, the clutch engagement control portion 102 controls a command value for the linear solenoid valve SL1 (an amount of electric current to be applied to the solenoid coil of the solenoid valve SL1) thereby controlling the hydraulic pressure to be applied from the linear solenoid valve SL1 to a hydraulic actuator provided for the clutch K0. By this hydraulic pressure control, the clutch K0 is placed in one of the engaged state (fully engaged state), slipping state and released state (fully released state). By this clutch engagement control by the clutch engagement control portion 102, the torque capacity of the clutch K0 (the torque transmitted through the clutch K0) is controlled according to the hydraulic pressure applied from the linear solenoid valve SL1 to the clutch K0. In other words, the clutch engagement control portion 102 is a clutch torque capacity control portion which commands the linear solenoid valve SL1 provided in the hydraulic control circuit 34, to control the torque capacity of the clutch K0.

A vehicle collision determining portion 104 is provided to detect a collision of the hybrid vehicle 10. Namely, the vehicle collision determining portion 104 is configured to determine whether a collision of the hybrid vehicle 10 with any other body which causes damage to the hybrid vehicle 10 has taken place. Preferably, this determination is made depending upon whether an amount of change of the longitudinal acceleration (deceleration) value G detected by the acceleration value sensor 74 has reached a predetermined threshold value stored in memory above which the hybrid vehicle 10 is considered to be damaged. Alternatively, the determination is made by determining whether a collision of the hybrid vehicle 10 is inevitable, depending upon positions, velocities, directions of movement and other information related to objects surrounding the hybrid vehicle 10, which information may be obtained by radar sensors, for example, and on the basis of predetermined threshold data stored in memory for the determination. That is, the vehicle collision determining portion 104 may be configured to forecast a collision of the hybrid vehicle 10. Where an air bag ECU for controlling the operation of the air bags is provided separately from the electronic control device 50, the determination may be made on the basis of information detected by the air bag ECU.

A speed determining portion 106 is provided to make a determination regarding a difference between the operating speed $N_E$ of the engine 12 and the operating speed $N_{MG}$ of the electric motor MG upon a collision of the hybrid vehicle 10, that is, when the vehicle collision determining portion 104 determines that a collision of the hybrid vehicle 10 has taken place. Described more specifically, the speed determining portion 106 is configured to determine whether the engine speed $N_E$ detected by the engine speed sensor 64 is lower than the electric motor speed $N_{MG}$ detected by the electric motor speed sensor 68 (whether $N_E < N_{MG}$).

An inverter discharging control portion 108 is provided to discharge the inverter 56 when a collision of the hybrid vehicle 10 has taken place. Namely, the inverter discharging control portion 108 is configured to discharge an electric load accumulated in the smoothing capacitor 82 in the inverter 56 when the vehicle collision determining portion 104 determines that a collision of the hybrid vehicle 10 has taken place. The inverter discharging control portion 108 is configured to open (turn off) the relays 60a and 60b to place the power supply lines from the electric energy storage device 58 to the inverter 56 in the power-off state immediately after the determination by the vehicle collision determining portion 104 that the collision of the hybrid vehicle 10 has taken place. Further, the engine drive control portion 100 commands the output control device 14 to stop the fuel supply from the fuel injecting device to the engine 12 (to implement a fuel cut control), while a clutch provided in the automatic transmission 18 is brought to its released (neutral) state to inhibit power transmission from the drive wheels 24 to the electric motor MG.

The clutch engagement control portion 102 controls the operating state of the clutch K0 during a discharging control of the inverter 56 implemented by the inverter discharging control portion 108. In embodiments, the clutch engagement control portion 102 initially brings the clutch K0 to its released state immediately after the determination by the vehicle collision determining portion 104 that the collision of the hybrid vehicle 10 has taken place. For example, the clutch engagement control portion 102 initially controls an output pressure of the linear solenoid valve SL1 so as to place the clutch K0 in the released state (fully released state).

The clutch engagement control portion 102 controls the operating state of the clutch K0 according to the result of the determination by the speed determining portion 106 during the discharging control of the inverter 56 implemented by the inverter discharging control portion 108. In embodiments, the clutch engagement control portion 102 brings the clutch K0 to its engaged state or released state according to the result of the determination by the speed determining portion 106 which is made after the clutch K0 is initially placed in the released state immediately after the determination of the collision of the hybrid vehicle 10. The clutch engagement control portion 102 brings the clutch K0 to the engaged state if the speed determining portion 106 determines that the operating speed $N_E$ of the engine 12 is lower than the operating speed $N_{MG}$ of the electric motor MG while the clutch K0 is initially placed in the released state. Namely, the clutch engagement control portion 102 controls the output pressure of the linear solenoid valve SL1 so as to increase the transmitted torque (torque capacity) of the clutch K0. The clutch engagement control portion 102 brings the clutch K0 to the released state if the speed determining portion 106 determines that the operating speed $N_E$ of the engine 12 is equal to or higher than the operating speed $N_{MG}$ of the electric motor MG. For example, the clutch engagement control portion 102 holds the clutch K0 in the released state if the clutch K0 is initially placed in the released state. Namely, the clutch engagement control portion 102 increases a force of engagement of the clutch K0 when the operating speed $N_E$ of the engine 12 is lower than the operating speed $N_{MG}$ of the electric motor MG after the collision of the hybrid vehicle, and reduces the force of engagement of the clutch K0 when the operating speed $N_E$ of the engine 12 is equal to or higher than the operating speed $N_{MG}$ of the electric motor MG after the collision of the hybrid vehicle.

The clutch engagement control portion 102 is preferably configured to periodically place the clutch K0 in the engaged and released states alternately during the discharging control of the inverter 56 implemented by the inverter discharging control portion 108 if the speed determining portion 106 determines that the operating speed $N_E$ of the engine 12 is lower than the operating speed $N_{MG}$ of the electric motor MG. Namely, if the operating speed $N_E$ of the engine 12 is lower than the operating speed $N_{MG}$ of the electric motor MG after the collision of the hybrid vehicle, the clutch engagement control portion 102 initially increases the force of engagement of the clutch K0 and then periodically increases and reduces the force of engagement of the clutch K0 alternately. In embodiments, the clutch engagement control portion 102 periodically changes the output pressure of the linear solenoid valve SL1 for periodically placing the clutch K0 in the engaged state (fully engaged state) and the released state (fully released state) alternately, if the speed determining portion 106 still determines that the operating speed $N_E$ of the engine 12 is lower than the operating speed $N_{MG}$ of the electric motor MG, even after the clutch K0 is brought to its engaged state after the determination that the operating speed $N_E$ of the engine 12 is lower than the operating speed $N_{MG}$ of the electric motor MG after the clutch K0 is initially placed in the released state. In embodiments, the clutch engagement control portion 102 continues to periodically place the clutch K0 in the engaged and released states alternately until the operating speed $N_{MG}$ of the electric motor MG has been lowered below a predetermined threshold value ($N_{MG}$=0, for instance).

Figure 4:
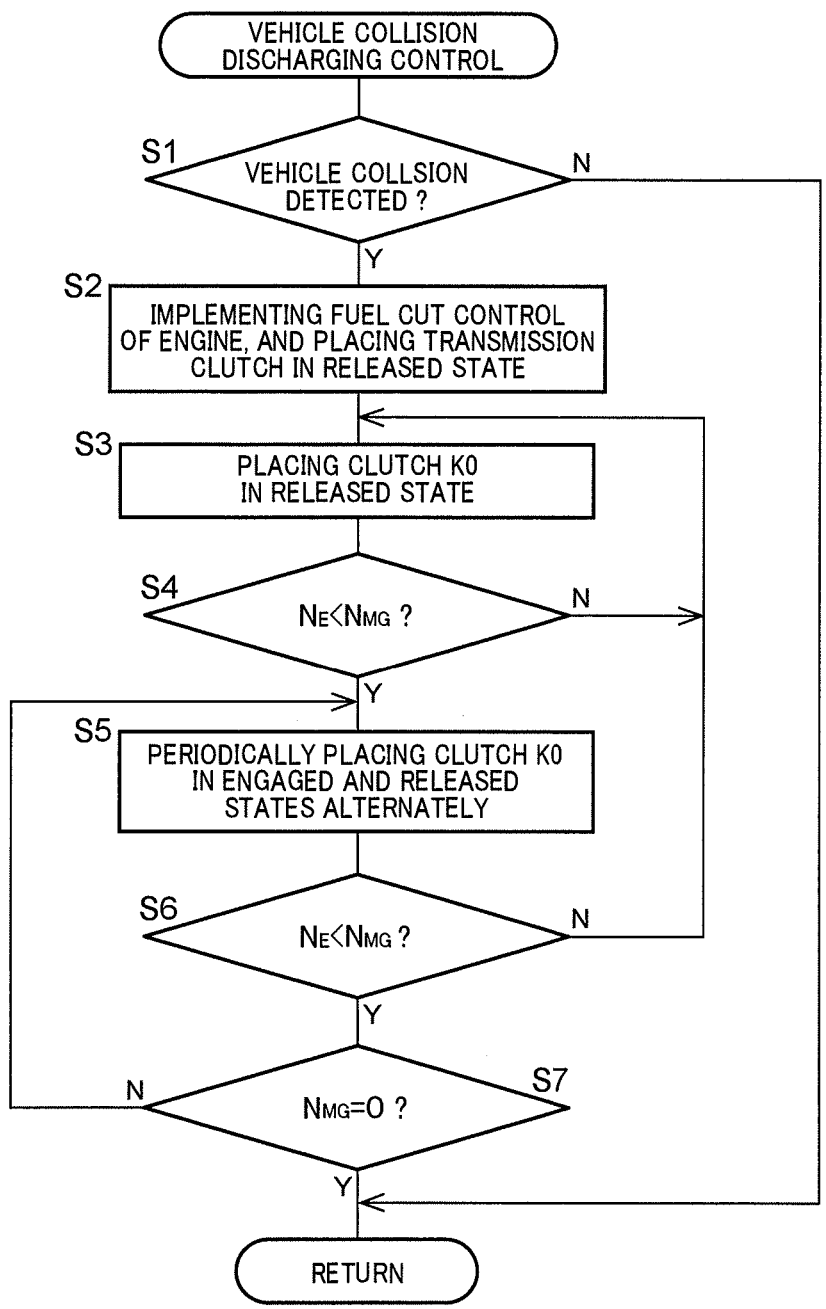
FIG. 4 is a flow chart of an example of a discharging control to be implemented by the electronic control device upon collision of the hybrid vehicle of FIG. 1.

FIG. 4 is a flow chart for explaining a major portion of an example of the discharging control to be implemented by the electronic control device 50 upon a collision of the hybrid vehicle. This discharging control is repeatedly implemented with a predetermined cycle time.

The discharging control is initiated with step S1 (hereinafter "step" being omitted) to make the determination as to whether a collision of the hybrid vehicle 10 has taken place on the basis of the longitudinal acceleration value G detected by the acceleration value sensor 74. If a negative determination is obtained in S1, the present control routine is terminated. If an affirmative determination is obtained in S1, the control flow goes to S2 to open the relays 60a and 60b for placing the power supply lines from the electric energy storage device 58 to the inverter 56 in the power-off state to command the output control device 14 to stop the fuel supply from the fuel injecting device to the engine 12 (to implement the fuel cut control), and to bring the clutch provided in the automatic transmission 18 in the released state (neutral state) for inhibiting the power transmission from the drive wheels 24 to the electric motor MG. Then, the control flow goes to S3 to initially place the clutch K0 in the released state (fully released state). The control flow then goes to S4 to determine whether the operating speed $N_E$ of the engine 12 is lower than the operating speed $N_{MG}$ of the electric motor MG. If a negative determination is obtained in S4, the control flow goes back to S3 and the following steps (i.e., the released state of the clutch K0 is maintained). If an affirmative determination is obtained in S4, the control flow goes to S5 to periodically change the output pressure of the linear solenoid valve SL1 to periodically place the clutch K0 in the engaged and released states alternately. Then, the control flow goes to S6 to determine whether the operating speed $N_E$ of the engine 12 is lower than the operating speed $N_{MG}$ of the electric motor MG. If a negative determination is obtained in S6, the control flow goes back to S3 and the following steps. If an affirmative determination is obtained in S6, the control flow goes to S7 to determine whether the operating speed $N_{MG}$ of the electric motor MG is zero. If a negative determination is obtained in S7, the control flow goes back to S5 and the following steps. If an affirmative determination is obtained in S7, the present control routine is terminated.

It will be understood from the foregoing description of the discharging control that S2 corresponds to an operation of the engine drive control portion 100, S3 and S5 correspond to an operation of the clutch engagement control portion 102, S1 corresponds to an operation of the vehicle collision determining portion 104, and that S4 and S6 correspond to an operation of the speed determining portion 106 while S2-S7 correspond to an operation of the inverter discharging control portion 108.

The embodiments described above are configured to increase the force of engagement of the clutch K0 when the operating speed $N_E$ of the engine 12 is lower than the operating speed $N_{MG}$ of the electric motor MG after the collision of the hybrid vehicle, and to reduce the force of engagement of the clutch K0 when the operating speed $N_E$ of the engine 12 is equal to or higher than the operating speed $N_{MG}$ of the electric motor MG after the collision of the hybrid vehicle. Accordingly, the clutch K0 is placed in the engaged state when the engine 12 applies a load to the electric motor MG, and is placed in the released state when the operating speed $N_{MG}$ of the electric motor MG is raised by the engine 12 in the engaged state of the clutch K0, so that the operating speed $N_{MG}$ of the electric motor MG can be rapidly lowered and the voltage of the inverter 56 can be rapidly lowered. It is noted in particular that regulation FMVSS305 (Prevention of Leakage of Electrolytic Solution and Electric Shock in Electric Vehicles) in the United States requires the voltage of an inverter to be lowered below 60V five seconds after the stopping of a vehicle due to collision and that the foregoing embodiments can suitably meet this requirement. Namely, the foregoing embodiments provide electronic control devices 50 for the hybrid vehicles 10 which permit rapid lowering of the voltage of the inverter 56 upon a collision of the hybrid vehicle.

Further, the force of engagement of the clutch K0 is increased and then periodically increased and reduced alternately when the operating speed $N_E$ of the engine 12 is lower than the operating speed $N_{MG}$ of the electric motor MG after the collision of the hybrid vehicle. Accordingly, it is possible to effectively reduce an increase in the temperature of the clutch K0, as well as to rapidly lower the operating speed $N_{MG}$ of the electric motor MG.

Another embodiment will now be described in detail with specific reference to the drawings. It is to be understood that the same reference signs will be used to identify the corresponding elements in the different embodiments.

Figure 5:
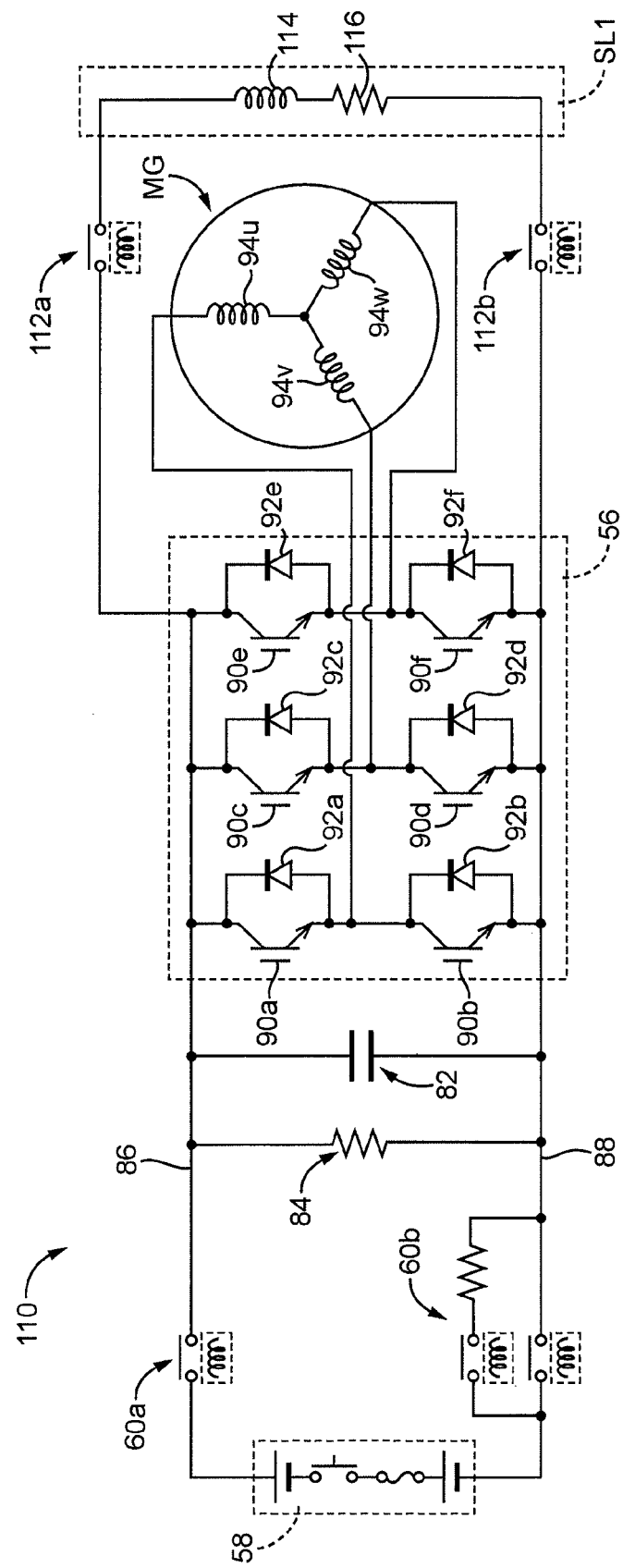
FIG. 5 schematically depicts a major portion of another example of the electric circuit for controlling the electric motor of the hybrid vehicle of FIG. 1.

Referring now to FIG. 5, a major portion of another electric circuit 110 for controlling the electric motor MG is schematically depicted. In the electric circuit 110 illustrated in FIG. 5, a drive circuit for the linear solenoid valve SL1 is electrically connected between the power line 86 and the earth line 88 through relays 112*a* and 112*b*. Preferably, a solenoid coil 114 and a resistor 116 provided in the linear solenoid valve SL1 are connected in parallel through the relays 112*a* and 112*b* to the smoothing capacitor 82 provided in the inverter 56. When the vehicle collision determining portion 104 determines that a collision of the hybrid vehicle 10 has taken place, the relays 112*a* and 112*b* are closed (turned on) to electrically connect the drive circuit of the linear solenoid valve SL1 between the power and earth lines 86 and 88. As described with respect to the preceding embodiment, the relays 60*a* and 60*b* are opened (turned off) when the vehicle collision determining portion 104 determines that the collision of the hybrid vehicle 10 has taken place. In this condition, a circuit including the smoothing capacitor 82, solenoid coil 114 and resistor 116 generates an electrical oscillation (LC oscillation) causing a flow of an oscillating electric current through the solenoid coil 114, etc. Accordingly, an amount of solenoid current applied to the linear solenoid valve SL1 periodically changes between positive and negative values so that the clutch K0 is periodically placed in the engaged and released states alternately, without the electric current being controlled by the electronic control device 50. In this embodiment, the relays 112*a* and 112*b* are closed in S5 in the control routine of FIG. 4 described above.

While various embodiments have been described in detail with reference to the drawings, it should be understood that the embodiments are not limited to the specific details illustrated in the drawings and described herein, and may be embodied with various changes without departing from the spirit and scope of the subject matter described herein.

NOMENCLATURE OF REFERENCE SIGNS

10: Hybrid vehicle
12: Engine
50: Electronic control device
56: Inverter
58: Electric-energy storage device
K0: Clutch
MG: Electric motor

The invention claimed is:

1. A control apparatus for a hybrid vehicle provided with an engine, an electric motor, a clutch disposed in a power transmitting path between the engine and the electric motor, and an inverter for supplying electric energy from an electric energy storage device to said electric motor, and the inverter being configured to be discharged upon a collision of the hybrid vehicle, wherein:
   the control apparatus comprises a processor and a memory storing a computer readable and executable instruction set which is executed by the processor to:
      determine when a collision of said hybrid vehicle has occurred;
      increase a force of engagement of said clutch when an operating speed of said engine is lower than an operating speed of said electric motor after the collision of the hybrid vehicle occurs; and
      reduce the force of engagement of said clutch when the operating speed of said engine is equal to or higher than the operating speed of said electric motor after the collision of the hybrid vehicle occurs.

2. The control apparatus according to claim 1, wherein the computer readable and executable instruction set, when executed by the processor, increases and then periodically increases and reduces, alternately, the force of engagement of said clutch when the operating speed of said engine is lower than the operating speed of said electric motor after the collision of the hybrid vehicle occurs and until the operating speed of the electric motor has been lowered below a threshold value.

3. The control apparatus according to claim 1, wherein the force of engagement of said clutch is increased until the operating speed of said engine is greater than or equal to the operating speed of said electric motor or until the operating speed of said electric motor is zero.

4. The control apparatus according to claim 1, wherein the force of engagement of said clutch is reduced until the operating speed of said engine is less than the operating speed of said electric motor.

5. A control apparatus for a hybrid vehicle provided with an engine, an electric motor, a clutch disposed in a power transmitting path between the engine and the electric motor, and an inverter for supplying electric energy from an electric energy storage device to said electric motor, and the inverter being configured to be discharged upon a collision of the hybrid vehicle, wherein:

the control apparatus comprises a processor and a memory storing a computer readable and executable instruction set which is executed by the processor to:

determine when a collision of said hybrid vehicle has occurred;

increase a force of engagement of said clutch when an operating speed of said engine is lower than an operating speed of said electric motor after the collision of the hybrid vehicle occurs and until the operating speed of said engine is greater than or equal to the operating speed of said electric motor or until the operating speed of said electric motor is zero; and reduce the force of engagement of said clutch when the operating speed of said engine is equal to or higher than the operating speed of said electric motor after the collision of the hybrid vehicle occurs and until the operating speed of said engine is less than the operating speed of said electric motor.

6. The control apparatus according to claim 5, wherein the computer readable and executable instruction set, when executed by the processor, increases and then periodically increases and reduces, alternately, the force of engagement of said clutch when the operating speed of said engine is lower than the operating speed of said electric motor after the collision of the hybrid vehicle occurs and until the operating speed of the electric motor has been lowered below a threshold value.

7. A control apparatus for a hybrid vehicle provided with an engine, an electric motor, a clutch disposed in a power transmitting path between the engine and the electric motor, and an inverter for supplying electric energy from an electric energy storage device to said electric motor, and the inverter being configured to be discharged upon a collision of the hybrid vehicle, wherein:

the control apparatus comprises a processor and a memory storing a computer readable and executable instruction set which is executed by the processor to:

determine when a collision of said hybrid vehicle has occurred;

increase and then periodically increase and reduce, alternately, a force of engagement of said clutch when an operating speed of said engine is lower than an operating speed of said electric motor after the collision of the hybrid vehicle occurs and until the operating speed of the electric motor has been lowered below a threshold value.

8. The control apparatus according to claim 1, wherein the computer readable and executable instruction set, when executed by processor:

places said clutch in a released state upon determination of occurrence of the collision of said hybrid vehicle;

determines whether the operating speed of said engine is lower than the operating speed of said electric motor;

switches said clutch from the released state to an engaged state when it is determined that the operating speed of said engine is lower than the operating speed of said electric motor; and maintains the released state of said clutch when it is determined that the operating speed of said engine is not lower than the operating speed of said electric motor.

9. The control apparatus according to claim 5, wherein the computer readable and executable instruction set, when executed by processor:

places said clutch in a released state upon determination of occurrence of the collision of said hybrid vehicle;

determines whether the operating speed of said engine is lower than the operating speed of said electric motor;

switches said clutch from the released state to an engaged state when it is determined that the operating speed of said engine is lower than the operating speed of said electric motor; and maintains the released state of said clutch when it is determined that the operating speed of said engine is not lower than the operating speed of said electric motor.

10. The control apparatus according to claim 7, wherein the computer readable and executable instruction set, when executed by processor:

places said clutch in a released state upon determination of occurrence of the collision of said hybrid vehicle;

determines whether the operating speed of said engine is lower than the operating speed of said electric motor;

switches said clutch from the released state to an engaged state when it is determined that the operating speed of said engine is lower than the operating speed of said electric motor; and maintains the released state of said clutch when it is determined that the operating speed of said engine is not lower than the operating speed of said electric motor.

* * * * *